S. W. RECORD.
Molds for Boot and Shoe Stiffeners.
No. 210,961. Patented Dec. 17, 1878.
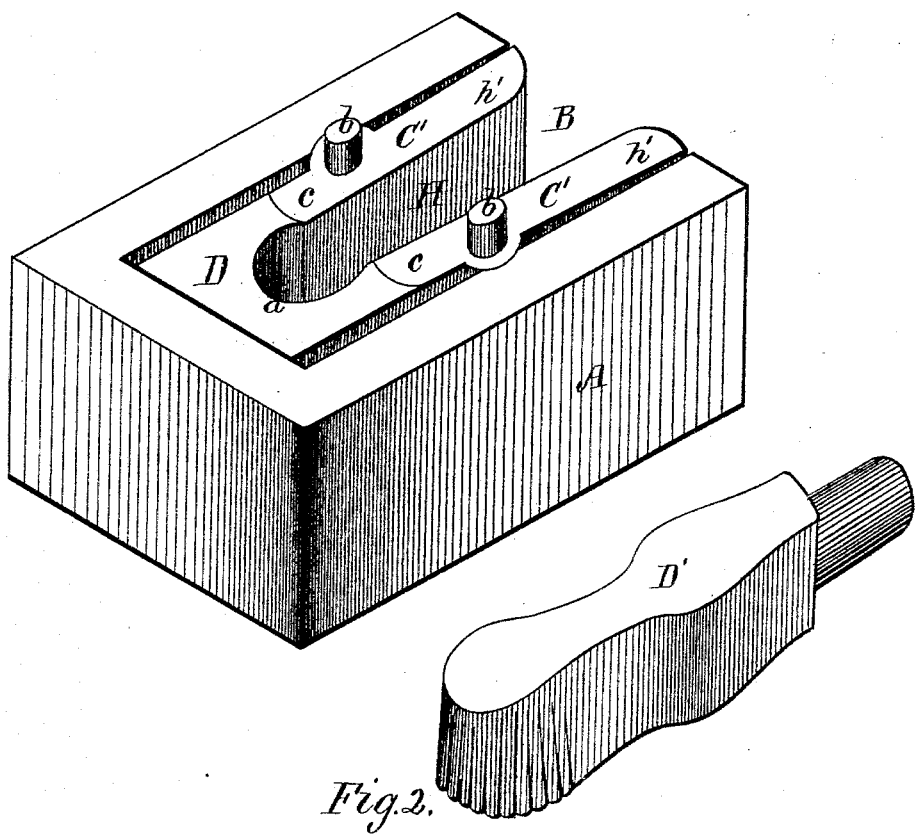
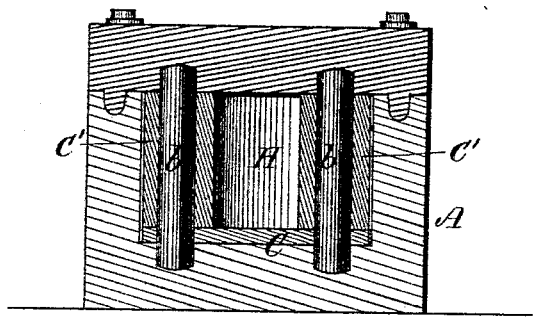

UNITED STATES PATENT OFFICE.

SOLOMON W. RECORD, OF KENNEBUNK, MAINE.

IMPROVEMENT IN MOLDS FOR BOOT AND SHOE STIFFENERS.

Specification forming part of Letters Patent No. 210,961, dated December 17, 1878; application filed November 23, 1878.

*To all whom it may concern:*

Be it known that I, SOLOMON W. RECORD, of Kennebunk, in the State of Maine, have invented certain new and useful Improvements in Molds for Boot and Shoe Stiffeners, of which the following is a specification:

This invention relates to the shaping or molding of boot and shoe counters or stiffeners from leather-board; and consists in a mold having yielding or elastic side walls adapted to close upon the sides of the stiffener as the latter is forced into and withdrawn from the mold, and exerts a powerful wiping or sleeking action upon such stiffener, which solidifies and finishes the same, and avoids the necessity of a second molding to produce the requisite finish, as has heretofore been found essential.

The drawings accompanying this specification represent, in Figure 1, a perspective view, and in Fig. 2 a vertical section, of a mold embodying my invention.

In the above-named drawings it will be seen that A represents a substantial block or bed-plate of cast-iron, having a horizontal chamber or inclosure, B, open at front. Within the chamber B, I place loosely a false floor or plate, C, and upon the rear end of this floor I erect a block or abutment, D, of a height equal to or somewhat greater than that of the largest stiffener which the mold is adapted to shape, the inner or concave side, $a$, of this abutment D being of such form as to impart the desired shape to the heel portion of the stiffener.

The greater portion of the recess B is of a width considerably greater than that of a stiffener, or of the rear portion, $a$, before named, the excess of width of said recess being occupied by two oppositely-disposed wings or jaws, C′ C′, which are capable of slight swinging movement in a horizontal plane upon upright pivots $b\ b$, erected upon the bed A, these wings C′ C′ constituting, in effect, the sides of the mold, while the portion $a$ constitutes the rear of such mold.

The pivots or pins $b\ b$ not only support and constitute fulcrums for the swinging wings C′ C′, but also, by passing through the floor C, as shown in Fig. 2 of the drawings, serve to secure the plate or floor C and wings C′ C′ together and confine them within the chamber B.

The floor or plate C, with its heel-abutment D, and the wings C′ C′, constitute, in effect, as before remarked, a shaping mold or die, H, to impart the requisite form to the stiffener, and the mold thus constituted is to be duplicated in different sizes, all of which are interchangeable with the outer or inclosing chamber, B, in order to accommodate the various sizes of stiffeners which will be required in the manufacture of boots and shoes.

It is true the heel-recess $a$ might directly constitute part of the chamber B, and the wings C′ C′ be pivoted within the latter, without the intervention of the movable floor C; but in this event the heavy bed-plate A must be employed with every size of stiffener.

A plunger (shown at D′) is employed to operate with the mold H, and this plunger is of a form, generally speaking, to conform to the shape of the said mold as bounded by the heel-recess $a$ and the inner walls of the wings C′ C′, but is of sufficient width at its front and rear ends to exert considerable pressure or friction in being crowded into the mold. As the plunger, carrying upon its forward end a counter or stiffener blank, is crowded into the mold H, and carries the stiffener before it, the sides of such stiffener first come in contact with the outer ends, $h'\ h'$, of the wings C′ C′, and are crowded outward against or close up to the boundaries of the chamber B, while the continued advance of the plunger and counter into the mold H results in such counter or stiffener being crowded with great pressure against the sides of said wings with a wiping or sleeking action, this continuing until the stiffener and forward end of the plunger pass by the pivots $b\ b$, when the passage of such stiffener and plunger between the inner ends or arms, $c\ c$, of the wings tends to crowd these arms outward, and would do so without any beneficial result did not the outer portion of the plunger, filling, as it does, the space between the outer ends of the wings, prevent closing of the latter, and hold the arms $c\ c$ rigidly in position. As the plunger is forced home, the stiffener is pressed between its inner end and the bottom $a$ of the mold with sufficient power to finish the heel portion of such counter. As the plunger and counter are withdrawn from the mold, the wings C' C' exert, for a second time, the same rubbing or sleeking action upon the stiffener, which polishes and finishes its surface, and condenses its fibers to such an extent as to render any after molding or finishing unnecessary.

In lieu of adapting the plunger to compel the crowding of the wings up to or against the counter, as stated, powerful springs may be introduced behind such wings; but in practice I prefer the former.

It will naturally be understood that the plunger is to be adapted in size to the size of the mold H—that is to say, with each size of mold a corresponding plunger must be provided.

I do not confine myself to the employment of the pivots $b\ b$ as a means of hinging the wings C' C', as this hinging may be effected in various ways.

I claim—

1. In apparatus for molding boot and shoe stiffeners, the combination, with a male die or follower, of a female die having a rigid heel-block and hinged wings or side pieces, substantially as set forth.

2. The combination, with the concave heel-block, of wings or side pieces forming a continuation of the heel-block, and hinged or pivoted at points between their ends, substantially as set forth.

3. The heel-block and hinged wings or side pieces, mounted on a removable false floor or plate, substantially as and for the purposes set forth.

SOLOMON W. RECORD.

Witnesses:
  WM. FAIRFIELD,
  JAMES A. FAIRFIELD.